(12) United States Patent
Bures et al.

(10) Patent No.: US 11,194,700 B2
(45) Date of Patent: Dec. 7, 2021

(54) METHOD OF TESTING OF IOT SYSTEM BEHAVIOUR IN CASE OF LIMITED NETWORK CONNECTION

(71) Applicant: CESKE VYSOKE UCENI TECHNICKE V PRAZE, Praha-Dejvice (CZ)

(72) Inventors: Miroslav Bures, Zizkov (CZ); Matej Klima, Hodkovicky (CZ)

(73) Assignee: CESKE VYSOKE UCENI TECHNICKE V PRAZE, Praha-Dejvice (CZ)

( * ) Notice: Subject to any disclaimer, the term of this patent is extended or adjusted under 35 U.S.C. 154(b) by 0 days.

(21) Appl. No.: 17/136,280

(22) Filed: Dec. 29, 2020

(65) Prior Publication Data
US 2021/0311857 A1    Oct. 7, 2021

(30) Foreign Application Priority Data
Dec. 30, 2019    (CZ) ................................ CZ2019-804

(51) Int. Cl.
*G06F 9/44*    (2018.01)
*G06F 11/36*    (2006.01)

(52) U.S. Cl.
CPC ........ *G06F 11/3676* (2013.01); *G06F 11/368* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| 10,742,721 | B1 * | 8/2020 | Wagner | ............... | H04L 12/4641 |
| 2013/0090911 | A1 * | 4/2013 | Segall | ................... | G06F 11/263 703/21 |

(Continued)

OTHER PUBLICATIONS

Ahmed et al., "Aspects of Quality in Internet of Things (IoT) Solutions: A Systematic Mapping Study," IEEE Access, (2019), vol. 7, pp. 13758-13780.

(Continued)

*Primary Examiner* — Qamrun Nahar
(74) *Attorney, Agent, or Firm* — Buchanan Ingersoll & Rooney PC

(57) ABSTRACT

The invention concerns the method of testing of the IoT system process behaviour in the case of limited network connection affecting part of the tested process where the basic structure for the tested process modelling is a directed graph and where the parts of the process in which failures of the network connection are expected are modelled as specific subgraphs—zones with a risk of connection failure (hereinafter referred to as ZRCF). Two levels of the testing coverage are employed that define the intensity of the generated test scenarios, meaning the number of tested combinations, wherein at the level one, each boundary is included once, where each transition with a failure and the subsequent recovery of network connection, modelled as a ZRCF boundary node, must be included in the test scenarios at least once, and wherein at the level two, all combinations of the boundaries where the test scenarios must include all possible combinations of the transition where a failure of connection with the transition will occur, in which recovery of connection will occur, where such transitions are modelled as a ZRCF boundary node, the input of which is the model of the tested process and the required level of the test coverage, and the output of which is a set of test scenarios defined as a sequence of nodes and edges in the model of the tested process which needs to be performed in the tests, being such that they meet the level of the testing coverage.

2 Claims, 3 Drawing Sheets

(56) References Cited

U.S. PATENT DOCUMENTS

| | | | |
|---|---|---|---|
| 2013/0091382 A1* | 4/2013 | Segall | G06F 11/3684 714/32 |
| 2018/0039567 A1 | 2/2018 | Rajagopalan et al. | |
| 2019/0132205 A1* | 5/2019 | Du | H04L 41/0893 |
| 2020/0065123 A1* | 2/2020 | Yang | G06F 9/455 |
| 2020/0092192 A1 | 3/2020 | Ekambaram et al. | |
| 2021/0026761 A1* | 1/2021 | Duffy | G06F 11/3684 |

OTHER PUBLICATIONS

Ammann et al., "Introduction to Software Testing," Cambridge University Press, New York, (2008), (346 pages).

Ammann et al., "Graph Coverage," Cambridge University Press, New York, (2008), pp. 27-103.

Arora et al., "Synthesizing Test Scenarios in UML Activity Diagram using a Bio-Inspired Approach," Computer Languages, Systems & Structures, (2017), vol. 50, pp. 1-19.

Chakraborty et al., "Security and Fault Tolerance in Internet of Things," Springer, 1st edition, (2019), XII, 214, p. 95.

Dwarakanath et al., "Minimum Number of Test Paths for Prime Path and other Structural Coverage Criteria," Computer Science, Software Engineering, (Sep. 22, 2018), arXiv:1809.08446v1 [cs.SE], pp. 1-17.

Giorgetti et al., "A Robust Wireless Sensor Network for Landslide Risk Analysis: System Design, Deployment, and Field Testing," IEEE Sensors Journal, (Aug. 15, 2016), vol. 16, No. 16, pp. 6374-6386.

Jia et al., "A Novel Graph-based Mechanism for Identifying Traffic Vulnerabilites in Smart Home IoT," IEEE INFOCOM 2018—IEEE Conference on Computer Communications, (Apr. 16-19, 2018), pp. 1493-1501.

Kooman et al., "TMAP Next," Sogeti, (2006), pp. 55-79.

Li et al., "Better Algorithms to Minimize the Cost of Test Paths," 2012 IEEE Fifth International Conference on Software Testing, Verification and Validation, (2012), vol. 1, pp. 280-289.

Sayyari et al., "Automated Generation of Software Testing Path Based on Ant Colony," Second International Congress on Technology, Communication and Knowledge (ICTCK 2015) (Nov. 11-12, 2015)—Mashhad Branch, Islamic Azad University, Mashhad, Iran, pp. 435-440.

* cited by examiner

METHOD OF TESTING OF IOT SYSTEM BEHAVIOUR IN CASE OF LIMITED NETWORK CONNECTION

FIELD OF THE INVENTION

The invention concerns the method of testing of the IoT system process behaviour in the case of limited network connection affecting part of the tested process where the basic structure for the tested process modelling is a directed graph and where the parts of the process in which failures of the network connection are expected are modelled as specific subgraphs—zones with a risk of connection failure (hereinafter referred to as ZRCF).

BACKGROUND OF THE INVENTION

For the operation of the Internet of Things (IoT) systems, reliability of such systems, in particular where critical systems are concerned, is what matters to a great extent. The overall reliability of the system is contributed by various factors, among which the system behaviour in the case of network connection failure and subsequent recovery of end user devices or parts of the general infrastructure. This situation is typical of systems used in smart transport, such as unavailability of mobile network signal in tunnels, etc., of systems belonging to the smart farming sector, e.g. not perfect coverage by mobile signal in rural areas, etc., of systems operating on large water areas, and others.

The behaviour of the IoT system in the situations when network connection failure and recovery occur must be properly tested as the system may not behave non-deterministically and the failure must not result in a loss of data or erroneous interruption of a running process, or a different error within the system run. Here, in particular the process aspect is relevant—what the process run in the system is like, if it is interrupted by a failure of the network connectivity. This does not mean the testing of the network behaviour at a lower level.

Currently, there are several test methodologies and techniques for testing processes in the systems, which can be applied to IoT systems. However, none of the aforementioned test methodologies and techniques is primarily focused on the described situation. These techniques allow test scenarios for specific processes and their variants in the tested system to be created. Considering the fact that these techniques focus on the testing of general processes and not on their behaviour during network connection failure, using such tests is not optimal both from the point of view of the overall demands of the tests—a combination of actions with no relevance to the failure of the network connection occurring in the system, which are practically useless from the point of view of the test—and from the point of view of the realistic ability of the test scenario to detect a relevant error concerning connection failure—the test scenarios do not include all combinations of actions that need to be tested in the system.

The existing techniques for generating test scenarios for processes in the system usually comprise the system processes modelling using a suitable notation and workflow or an algorithm for the creation of test scenarios based on this model. The model of the tested system comprises structures that are based on an oriented graph; for definition, see for example Ammann, P., & Offutt, J. (2016). Introduction to software testing. Cambridge University Press.

For the creation of test scenarios, published were both techniques prepared in the form of methodological instructions, see Koomen, T., Broekman, B., van der Aalst, L., & Vroon, M. (2013). TMap next: for result-driven testing. Uitgeverij kleine Uil, and several formalized algorithms for the generating of test scenarios, such as Anurag Dwarakanath and Aruna Jankiti, "Minimum number of test paths for prime path and other structural coverage criteria", in IFIP International Conference on Testing Software and Systems (2014), pp. 63-79, Nan Li, Fei Li, and Jeff Offutt, "Better algorithms to minimize the cost of test paths", in Software Testing, Verification and Validation (ICST), 2012 IEEE Fifth International Conference on (2012), pp. 280-289, Vinay Arora, Rajesh Bhatia, and Maninder Singh, "Synthesizing test scenarios in UML activity diagram using a Bio-inspired approach", Computer Languages, Systems & Structures (2017) or Faeghe Sayyari and Sima Emadi, "Automated generation of software testing path based on ant colony", in Technology, Communication and Knowledge (ICTCK), 2015 International Congress on (2015), pp. 435-440. Nevertheless, these concern general techniques for generating tests of processes in the tested system, which are not specifically focused on the behaviour of an IoT system in the case of limited network connection and have the potential disadvantages mentioned above.

As far as the area of direct testing of IoT system behaviour in the case of limited network connection is concerned, an extensive search of available literature covering the recently published testing techniques for IoT systems has been provided, e.g. Ahmed, B. S., Bures, M., Frajtak, K., & Cerny, T. (2019). Aspects of Quality in Internet of Things (IoT) Solutions: A Systematic Mapping Study. IEEE Access, 7, 13758-13780, with no study focused on the subject-matter found. Within the framework of the available literature search, a total of 478 articles from the IEEE Xplore, Elsevier ScienceDirect, ACM Digital Library, and SpringerLink databases have been analysed.

SUMMARY OF THE INVENTION

The aforementioned deficiencies have been removed to a great extent by the method of testing of the IoT system process behaviour in the case of limited network connection affecting part of the tested process where the basic structure for the tested process modelling is a directed graph and where the parts of the process in which failures of network connection are expected are modelled as specific subgraphs—zones with a risk of connection failure (hereinafter referred to as ZRCF) according to the present invention. The method utilizes two levels of the testing coverage defining the intensity of the generated test scenarios, meaning the number of tested combinations, wherein on the one level, each boundary is included once, where each transition with a failure and recovery of network connection modelled as a ZRCF boundary node must be included in the test scenarios at least once, and wherein on the other level, all combinations of the boundaries must be included where the test scenarios must include all possible combinations of the transition in which a failure of connection with the transition will occur, in which the recovery of the connection will occur, where such transitions are modelled as a ZRCF boundary node, the input of which is the model of the tested process and the required level of the test coverage and the output of which is a set of test scenarios defined as a sequence of nodes and edges in the model of the tested process which needs to be performed in the tests, being such that they correspond to the level of the testing coverage.

The preparation of the test scenarios preferably consists of two basic steps: (1) finding relevant paths within the ZRCFs between their boundary nodes, via which it is possible to enter and exit the ZRCF within the framework of the tested process, and (2) the subsequent integration of such paths in the general test scenarios, which should be minimal from the point of view of a total number of the test steps, and should start in the initial node of the tested process model and should end in some of its terminal nodes.

The basis of the designed method is to prepare a model of the tested IoT system and automated preparation of test scenarios using a suitable algorithm allowing the scenarios to be primarily focused on the situation involving a failure of the network connection in the course of the process in the tested system.

The model takes into account the susceptibility of individual parts of the system to connection failure. Such susceptibility is then tested for a simulated situation where a failure of network connection occurs in a certain part or certain parts of the process. Typically, involved in the process are several devices, of which part is movable and can experience a failure of connection. Test scenarios are prepared for a specific selected case of connection failure.

A directed graph, the nodes of which represent individual steps of the process, and/or decision-making points in the process and the edges represent transitions between the steps and decision-making points, is used as a model of the tested system. An example is shown in FIG. 1. The process is implemented by three subsystems A, B, and C. They may pass control to one another as necessary. After attending by the system B, the process is returned to the system A, see the function 10.

The functions of individual subsystems composing the process are designated by numbers from 1 to 11. The decision-making points in the process are designated by numbers from 21 to 23.

The susceptibility of individual parts of the system to connection failure is modelled by the appraisal of individual nodes and edges. The simulated situation where certain part(s) of the process are subject to network connection failure is then modelled using the respective subgraph. The steps of the process found in this subgraph are affected by a failure of network connection.

From the point of view of the test, what matters most is the behaviour of the tested system in the step of the process when the connection failure occurs, then the behaviour during the subsequent steps when the system has no available network connection, and finally, the behaviour of the system in the step of the process when the network connection is recovered.

The set of test scenarios created specifically for testing IoT system behaviour in the case of limited network connection should primarily test the sequence of steps mentioned above, while there is no need to go through the parts of the process, which are not directly affected by the connection failure.

The test scenario must start at the beginning of the process, must pass through the step of the process in which connection failure occurs, then proceeds to the subgraph modelling the steps of the process affected by the limitation of network connection. The next step of the process in the scenario involves the recovery of network connection, and the scenario ends in some of the end steps of the process.

The example is shown in FIG. 1. The subsystem B is subjected to a failure of network connection. In the process model, this situation corresponds to the subgraph designated by the red background, i.e. the functions 3, 4, 5 and the decision-making point 2. One of the required test scenarios is designated by bold arrows.

With this method of modelling, there may be several steps of the process in which connection failure occurs as well as steps in which the connection is recovered again. This naturally corresponds to the following realistic situation: typically, involved in the process are several devices, of which part is movable and can experience a failure of connection. The part of the process implemented by a specific device is accessible by several transitions between the steps of the process. Similarly, the same part of the process can be exited through several different steps. In the example in FIG. 1 such transitions are designated by the red colour of the arrows.

As far as test scenarios are concerned, what also matters are the combinations in which the graph edges are passed, i.e. the transitions between the steps of the process within the framework of the test scenario, in FIG. 1 the arrows where the network connection failure and recovery occurs.

Two alternatives—conditions that the test scenarios need to fulfil have been considered:

1. Each transition where connection failure and recovery occurs must be included in the test scenarios at least once
2. The test scenarios must include all possible combinations of the transition where a failure of the connection occurs along with the transition where the connection is recovered The alternative 2 results in a greater number of test scenarios and also in a higher likelihood of detection of defects that are caused by the situation of limited network connection.

In addition, it is understood that there can be more than one of such subgraphs that model a failure of network connection. For reasons of efficiency, it is not desirable to design a specific set of test scenarios for each subgraph but create only one set that will be minimized.

The principles of the problem modelling are mentioned in the master thesis by Ing. Matěj Klíma titled "Framework for Evaluation of Properties of Test Scenarios for Connectivity Tests in IoT Systems" defended at the Department of Computer Science at the Faculty of Electrical Engineering of the Czech Technical University in Prague. The subject-matter of the patent is a method of generating test scenarios from the aforementioned model.

The input received by this algorithm is the model of the tested system and the output provided by the algorithm is a set of test scenarios. For the description of the algorithm, the following concepts and symbols are used:

Model of the process in the tested system—a directed graph where a node of the graph models an action, function or step in the tested process or a branching point in the process while edges model transitions between two actions, functions, steps or branching points.

ZRCF—a zone with a risk of connection failure—refers to a subgraph that models a failure of network connection. The model of the process in the tested system may comprise more than one of such subgraphs. The ZRCF is determined by the analyst based on the modelling of assumed situations that may arise during the IoT system operation. The ZRCF boundary nodes are classified as follows:

a. ZRCF INPUT—actions, functions or steps in the tested process or branching points in the process which are entered by transitions affected by a failure of the network connection b. ZRCF OUTPUT—actions, functions or steps in the tested process or branching points in the process, from which transitions affected by the failure of the network connection exit C—criterion of the testing coverage determining the intensity of test scenarios.

The algorithm works with two alternatives:

a. Each boundary once—Each transition where the connection failure and recovery occur (modelled as a ZRCF boundary node) must be included in the test scenarios at least once b. All combinations of boundaries—The test scenarios must include all possible combinations of the transition where a failure of the connection occurs along with the transition where the recovery of the connection occurs (such transitions are modelled as a ZRCF boundary node)

Test scenario—the sequence of nodes and edges in the model of the tested process that needs to be carried out within the framework of the tests.

The algorithm consists of two parts:

1. Find_shortest_paths_inside_zones—the auxiliary part of the algorithm, which is first called to generate a ZRCF-paths auxiliary set comprising the found shortest paths within the ZRCF.

2. Create_test_scenarios—the main algorithm that will create a set of test scenarios based on the model of the process in the tested system and the ZRCFpaths set.

The Algorithm Find_Shortest_Paths_Inside_Zones

Input: The model of the process in the tested system G (includes one or more than one ZRCFs).

Output: The ZRCFpaths set of the shortest paths inside the ZRCF.

The Steps of the Algorithm:

```
1   ZRCFpaths ←0
2   external Paths ←0
3   OutputNodes ←0
4   Input Nodes ←0
5   For each output node e from individual ZRCF zones,
6     an empty queue F is created.
7     e is then put to the end of the queue F.
8     Until the queue is empty:
9       The first node n is removed from F,
10      the distance d between the node n and the terminal node e is saved.
11      Then all parents p of the node n are gone through.
12      If the distance of the parent p is greater than d + 1, the distance
        of each parent of the gone through
13      node is set to d + 1.
14      Finally, the parent p is put to the end of the queue F.
15    For each input node s from the gone through zone L:
16      A new set of nodes P is created.
17      Then the nodes from s to e are gone through in the following manner:
        always the node at
18      the shortest distance (which was determined in the previous part of
        the algorithm) is proceeded
19      with. The nodes are put to the P set in the order in which they are
        gone through.
20      If the size of the P set is greater than 1, the P is included in the
        ZRCFpaths set
```

The Algorithm Create_Test_Scenarios

Input: The model of the process in the tested system G (comprising one or more than one ZRCFs), the ZRCFpaths set of the shortest paths inside ZRCF, the coverage criterion C.

Output: A set of test scenarios T.

The Steps of the Algorithm:

```
1   P ← ZRCFpaths
2   potentialTS ←0
3   Until the P set is empty,
4     the start node is put in the queue F.
5     a new set of the nodes p is created
6     Until the queue F is empty:
7       The first node n is removed from F.
8       If n is the input node of the zone and P comprises the element (path)
        c, which starts in n,
9         the path c is removed from the queue F and its last node e is saved.
10        Subsequently, all paths existing in P that connect n and e are
          removed.
11        If C = "Each boundary once"
12          All paths existing in P that lead to e are removed.
13        All nodes along the path c are gone through and their dependencies
          (parent, child) are saved in
14        the potentialTS set.
15        All nodes are removed from the queue F and the node e is put to the
          end of the queue.
16      Otherwise:
17        If n is the terminal node in the graph,
18          nodes in the potentialTS are gone through and saved in a new set t.
19          t is included in the set T.
20        Otherwise:
21          the child d of the node n is included in the potentialTS set.
```

BRIEF DESCRIPTION OF FIGURES

The method of testing of the IoT system process behaviour in the case of limited network connection affecting part of the tested process according to the present invention will be described in detail on a specific example of embodiment using the attached drawings, where.

EXAMPLES OF THE INVENTION EMBODIMENT

The workflow for the creation of test scenarios is demonstrated by way of example of an IoT system from the field of smart transport. Considering the dynamic character of such systems and possible failures of network connections in certain parts of agglomerations, such as tunnels, smart transport is one of typical application areas.

Figure 1:
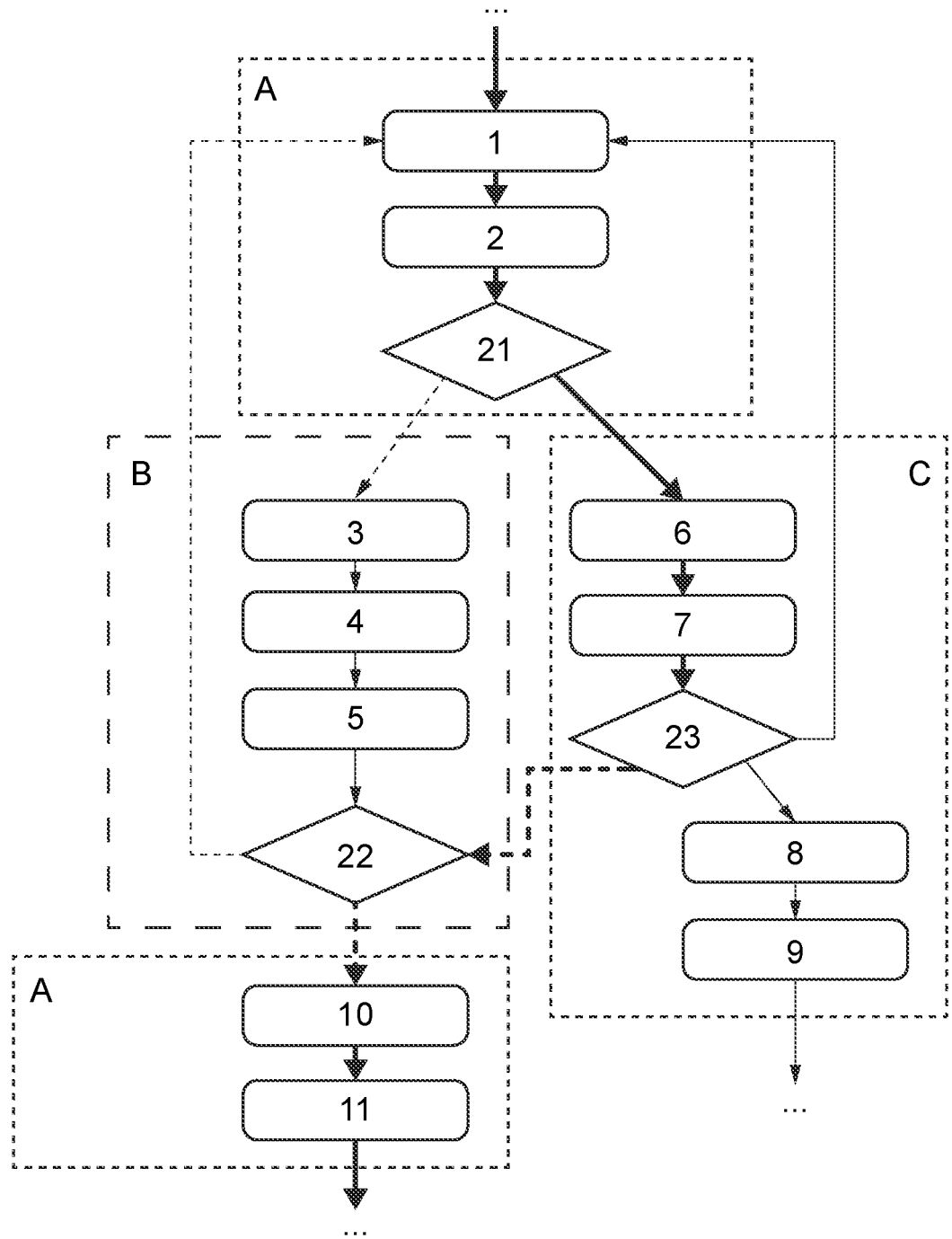
FIG. 1 shows the situation of network connection failure in the IoT system model.
Figure 2A:
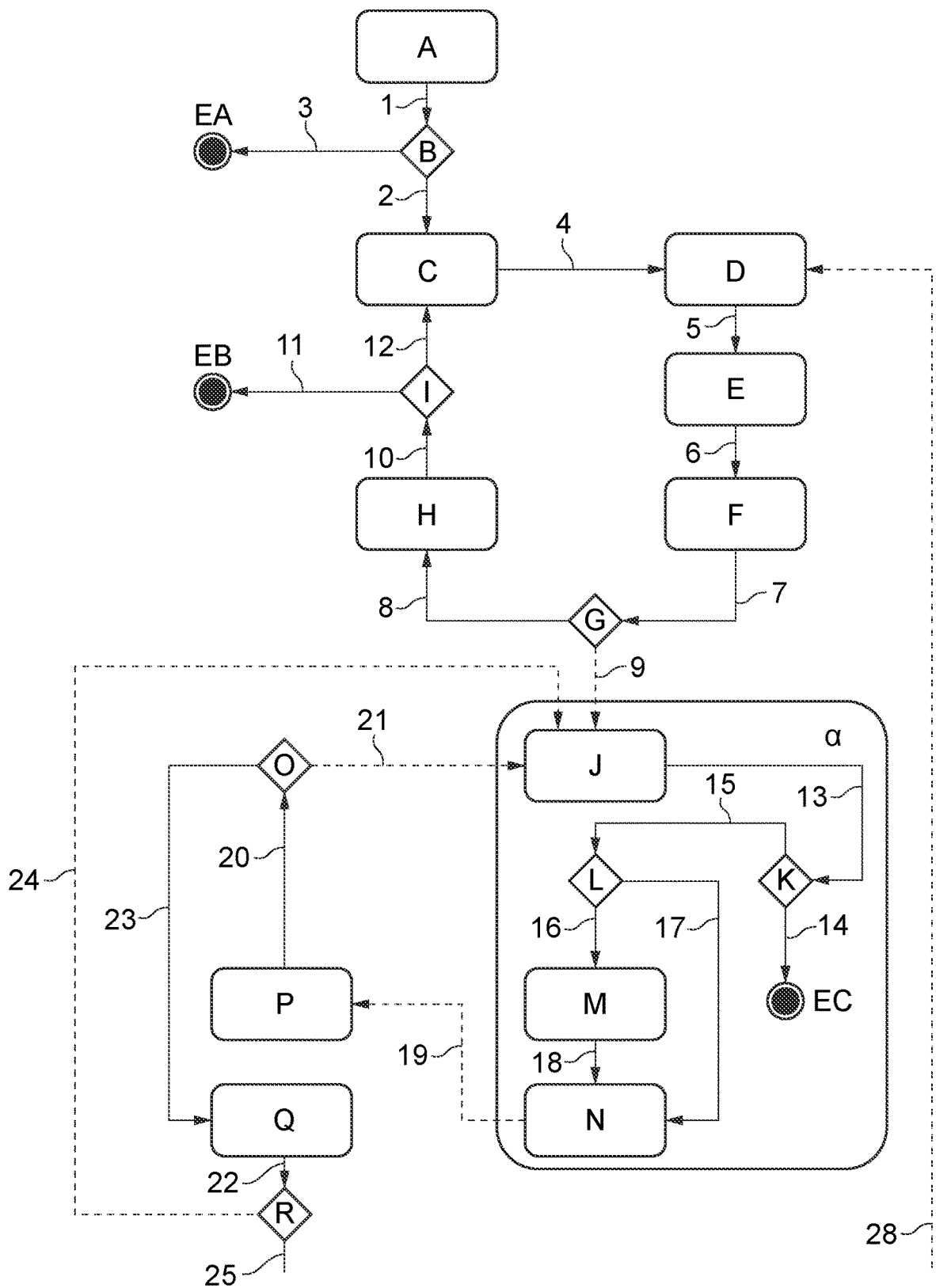
In FIGS. 2A and 2B, the model of the tested process—booking of a parking place in the IoT supporting smart transport is shown.
Figure 2B:
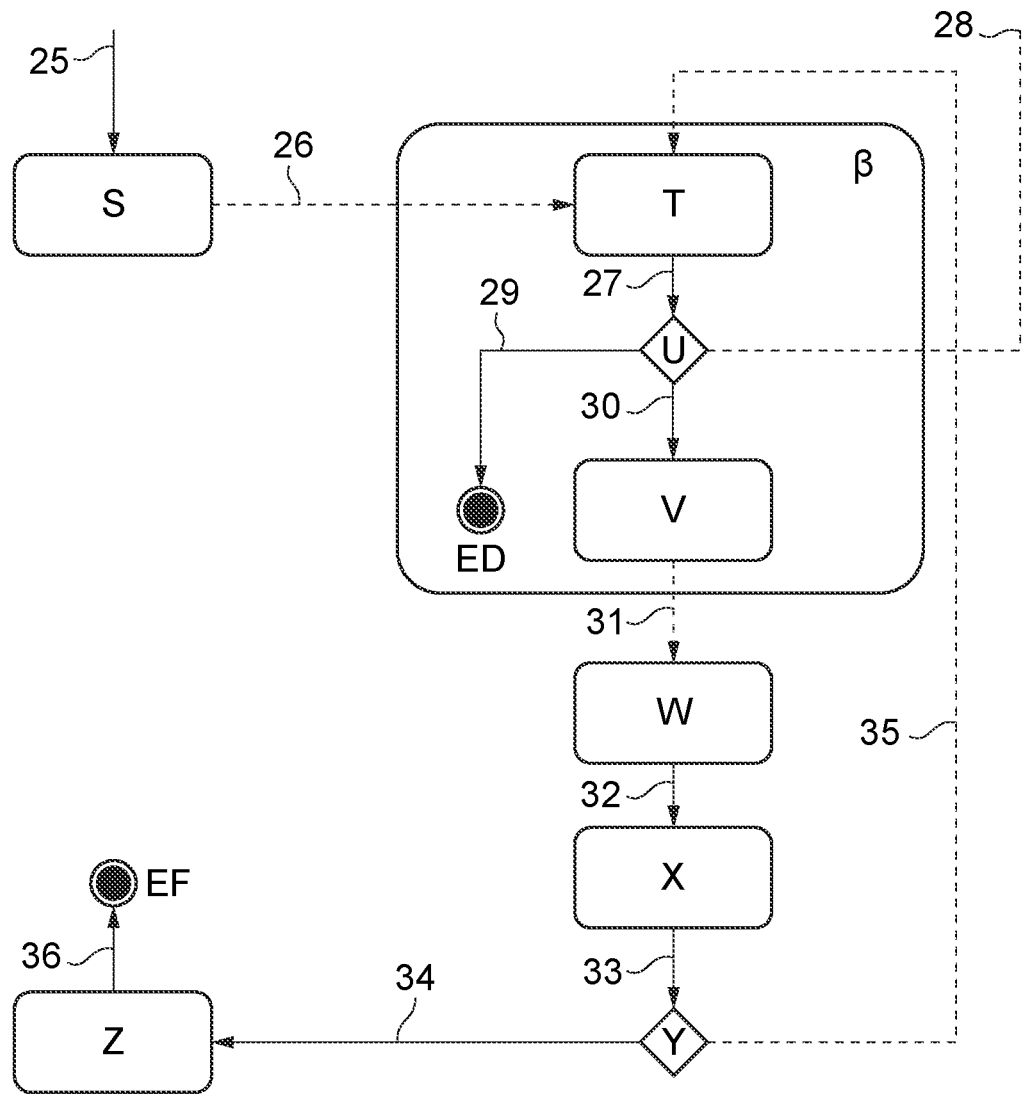

The process reflected in the model of the tested system process provided in FIGS. 2A and 2B refers to booking a parking place by a remotely connected smart vehicle that communicates with the smart car park system. The model includes several decision-making nodes the evaluation of which mostly depends on the decision of the initiator of the parking place booking, typically, on the driver of the vehicle connected as the end user device of the IoT system.

The model includes activities referring to a summary name for an action, function, or step in the tested process or a branching point in the process, which are always designated by capitalized letters whereas transitions between them are designated by numerals. The rectangles refer to designated actions, functions, or steps, and the diamonds refer to designated branching points.

The following Table 1 provides a key to the activities shown in the diagrams in FIGS. 2A and 2B. For the branching points, the results of the decision-making process are described by captions for transitions next to the given numeral. The overview is divided into the part of the process concerning the smart vehicle and that of the car park system.

TABLE 1

| Smart vehicle | Car park system |
|---|---|
| A Reception of a request for finding the nearest car park | D Reception of a query about the number of places available in the car park |
| 2 car park found | E Finding the state of availability of the parking places |
| 3 no car park within the reach | F Sending the answer concerning the availability of the parking places |
| C Sending the query about the number of places available in the car park | 9 there are available places in the car park |
| H Reception of the message that the car park is full | 8 no available parking places |
| 12 repeating the request | 23 the parking place is available |
| 11 refusal on the part of the car park | 21 the parking place is unavailable |
| J Reception of available parking places for booking | P Reception of requests for parking place booking |
| 15 approval on the part of the car park | Q Parking place booking |
| 14 refusal on the part of the car park | 24 booking successful |
| 17 manual selection | 25 booking unsuccessful |
| 16 random selection | S Sending summary information for the order |
| M Selection of the requested parking place | W Reception of payment details |
| N Sending a request for the required parking place | X Making the payment |
| T Reception of the summary information for the order | 34 the payment approved |
| 30 approval of the order | 35 the payment rejected |
| 29 rejection of the order | |
| 28 change of the order | |
| V Sending of payment details | |
| Z Reception of the confirmation of successful parking place booking | |

Specific transitions in the process, which are affected by the expected failure of network connection and which are determined by the analyst based on the respective situation concerning the system operation, are highlighted in red. The following transitions are concerned: 9, 19, 21, 24, 26, 28, 31, and 35. These transitions form the boundary of the ZRCF in the model defined above. The outlined situation of booking a parking place by a smart vehicle includes two of such ZRCF areas, in the diagram shown in the figure designated as ax and P. In accordance with the defined concepts, the activities in which the transitions affected by a failure of network connection are involved, are referred to as INPUT in the ZRCF. The activities, being the output of the transitions affected by the failure of network connection are then referred to as ZRCF OUTPUT and are always distinguished by the red colour of the arrow.

The ZRCF α comprises one ZRCF INPUT node, designated by letter J and one ZRCF OUTPUT node designated by letter N. The transitions in the process affected by a failure of network connection included in the ZRCF α refer to one ZRCF INPUT node, designated by letter J and one ZRCF OUTPUT node designated by letter N.

The content of the ZRCFpaths after the implementation of the algorithm Find_shortest_paths_inside_zones follows:

| ZRCF | ZRCF INPUT | ZRCF OUTPUT | The path |
|---|---|---|---|
| ZRCF α | J | N | J - 13 - K - 15 - L - 17 - N |
| | J | EC | J - 13 - K - 14 - EC |
| ZRCF β | T | U | T - 27 - U |
| | T | V | T - 27 - U - 30 - V |
| | T | ED | T - 27 - U - 29 - ED |

After the implementation of the algorithm Create_test_scenarios with the coverage "All combinations of boundaries" the set of test scenarios comprises the following three scenarios:

A - 1 - B - 2 - C - 4 - D - 5 - E - 6 - F - 7 - G - 9 - J - 13 - K - 14 - EC
A - 1 - B - 2 - C - 4 - D - 5 - E - 6 - F - 7 - G - 9 - J - 13 - K - 15 - L - 17 - N - 19 - P - 20 - O - 21 - J - 13 - K - 14 - EC
A - 1 - B - 2 - C - 4 - D - 5 - E - 6 - F - 7 - G - 9 - J - 13 - K - 15 - L - 17 - N - 19 - P - 20 - O - 23 - Q - 22 - R - 25 - S - 26 - T - 27 - U - 30 - V - 31 - W - 32 - X - 33 - Y - 35 - T - 27 - U - 29 - ED

After the implementation of the algorithm Create_test_scenarios with the coverage "Each boundary once" the set of test scenarios comprises the following three scenarios:

A - 1 - B - 2 - C - 4 - D - 5 - E - 6 - F - 7 - G - 9 - J - 13 - K - 15 - L - 17 - N - 19 - P - 20 - O - 21 - J - 13 - K - 14 - EC

A - 1 - B - 2 - C - 4 - D - 5 - E - 6 - F - 7 - G - 9 - J - 13 - K - 15 - L - 17 - N - 19 - P - 20 - O - 23 - Q - 22 - R - 25 - S - 26 - T - 27 - U - 29 - ED
A - 1 - B - 2 - C - 4 - D - 5 - E - 6 - F - 7 - G - 9 - J - 13 - K - 15 - L - 17 - N - 19 - P - 20 - O - 23 - Q - 22 - R - 25 - S - 26 - T - 27 - U - 30 - V - 31 - W - 32 - X - 33 - Y - 34 - Z - 36 - EF

The parts of the test scenarios running through individual ZRCF are designated in bold letters.

The invention claimed is:

1. A method of testing of an IoT system process behaviour in a case of limited network connection affecting a part of a tested process, where a basic structure for the tested process modelling is a directed graph and where the part of the tested process in which failures of network connection are expected are modelled as specific subgraphs——zones with a risk of connection failure "ZRCF", characterized in that the method utilizes two levels of testing coverage defining intensity of generated test scenarios, meaning a number of tested combinations, wherein at the level one, each boundary is included once, where each transition with a failure and subsequent recovery of network connection, modelled as a ZRCF boundary node, must be included in the test scenarios at least once, and wherein at the level two, all combinations of the boundaries where the test scenarios must include all possible combinations of the transition where a failure of connection with the transition will occur, in which recovery of connection will occur, where such transitions are modelled as a ZRCF boundary node, an input of which is a model of the tested process and the required level of the test coverage, and an output of which is a set of test scenarios defined as a sequence of nodes and edges in the model of the tested process which needs to be performed in tests, being such that they meet the level of the testing coverage.

2. The method according to claim 1, characterized in that creation of the test scenarios proceeds in two basic steps:
    (1) finding relevant paths inside the ZRCF between their boundary nodes via which it is possible to enter and exit the ZRCF in the tested process, and
    (2) subsequent incorporation of these paths in overall test scenarios, which should be minimal from a point of view of a total number of test steps, start in an initial node of the tested process and end in some of its terminal nodes.

* * * * *